United States Patent [19]

Henrich et al.

[11] Patent Number: 4,613,344
[45] Date of Patent: Sep. 23, 1986

[54] METHOD AND APPARATUS FOR CLEANING HOT GASES PRODUCED DURING A COAL GASIFICATION PROCESS

[75] Inventors: Günter Henrich, Leverkusen; Harald Hoffmann, Much; Heinz-Dieter Waldhecker, Rösrath; Klaus-Peter Mey, Frechen, all of Fed. Rep. of Germany

[73] Assignee: Klöckner-Humboldt-Deutz AG, Fed. Rep. of Germany

[21] Appl. No.: 666,631

[22] Filed: Oct. 31, 1984

[30] Foreign Application Priority Data

Nov. 7, 1983 [DE] Fed. Rep. of Germany ....... 3340204

[51] Int. Cl.[4] .............................................. C10J 3/56
[52] U.S. Cl. ..................... 48/77; 48/197 R; 48/210; 165/104.16; 423/230
[58] Field of Search .......... 48/210, 197 R, 77; 423/230; 165/104.16

[56] References Cited

U.S. PATENT DOCUMENTS 4,170,550 10/1979 Kamody ........................... 48/210 X
4,233,275 11/1980 Kimura et al. ................... 48/210 X
4,282,009 8/1981 Belke et al. ......................... 48/77 X
4,395,975 8/1983 Ashworth et al. ............... 48/210 X Primary Examiner—Arthur Kellogg
Attorney, Agent, or Firm—Hill, Van Santen, Steadman & Simpson

[57] ABSTRACT

A method and apparatus for cleaning hot gases produced during a coal gasification process in a reactor, wherein the hot gases leaving the reactor are cooled in a plurality of cooling stages to a relatively low temperature. In accordance with this invention, a particulated solid is added to the hot gases and circulated through at least one of the cooling stages. The particulated solid may be a material which decomposes in the hot gases to liberate carbon dioxide or it may be inert.

The apparatus of the invention makes use of a heat exchanger which functions as a radiant cooler and also as a mixer for the gases and solids, the heat exchanger being connected directly to the gasification reactor at the exhaust gas side thereof. The heat exchanger is followed by at least one downstream, multi-stage cyclone fluidized bed heat exchanger which also is provided with an indirect heat exchange capability.

10 Claims, 3 Drawing Figures

METHOD AND APPARATUS FOR CLEANING HOT GASES PRODUCED DURING A COAL GASIFICATION PROCESS

BACKGROUND OF THE INVENTION

1. Field of the Invention

This invention is in the field of cleaning hot gases along with heat recovery and is particularly directed to the treatment of hot coal gas from a coal gasification process wherein the coal gas is cooled down to such a degree that a final cleaning of the gas can take place at low temperatures.

2. Description of the Prior Art

The gaseous product of a coal gasification process produced, for example, in an iron bath reactor in which carbonaceous materials are converted in the presence of oxygen to form a coal gas essentially consisting of CO and $H_2$ generally has a temperature between 1300° and 1700° C. The coal gas contains solid, liquid and gaseous contaminants. Both the high temperature as well as the necessity of removing the contaminants present in the coal gas present substantial problems.

Due to physical limitations, the coal gas can only be cleaned effectively at temperatures below 550° C. and preferably should be cooled down to below 100° C. Consequently, the coal gas must first be cooled effectively and then cleaned, and the sensible heat should be capable of being recovered at the same time.

Filters are known in the prior art in which the filter medium consists of a layer of bulk material which is resistant to high temperatures. This type of hot gas filtration, however, makes it nearly impossible to eliminate substances that do not become solid or liquid until lower temperatures are achieved in the gas. Beyond this, it is fundamentally extremely difficult to separate solid and liquid contaminants at high temperatures, since the dusts being formed are usually sticky and caking. Attempts to condense, solidify or desublimate the contaminants or other injurious substances in the product gas can produce considerable disruptions or reductions in useful life in the succeeding process stages during the cooling. For example, exhaust gas conduits and boiler surfaces can become caked and thus become less effective.

A method for hot gas dust removal is known from German Patent No. 24 24 932 wherein the coal gases of an iron bath reactor are subjected to a coarse dedusting. The disadvantages in this method reside in that fine contaminants in the coal dust cannot be removed and this applies particularly to the fine dust as well as to other components that are liquid or gaseous at high temperatures and only become solid or liquid at very low temperatures.

It is known from DE-OS No. 30 24 977 to conduct the coal gas of a coal gasification process through a heat exchanger whereby the product gas transfers its heat to the carbon carrier. This reference, however, provides no particulars regarding a dedusting or cleaning of the gases.

EP-OS No. 0054099 discloses a method and an apparatus for cleaning hot gases, particularly for steel and iron bath reactors, wherein the hot gases are cooled down to such a degree that a final cleaning at low temperature can take place in an electrostatic filter. There is no disclosure in this reference, however, as to how the heat exchange should take place. It is also silent as to how the particularly critical temperature ranges involved in the cooling can be traversed.

SUMMARY OF THE INVENTION

The present invention provides a method and apparatus for cleaning hot gases with simultaneous heat recovery, whereby the final cleaning of the gases can take place at optimum temperatures to adapt the gas for the requirements of the use to which the gas is put. At the same time, the energy losses of the of the overall process are minimized. Further, dangerous temperature ranges in which sticking or soot formation occur are traversed quickly, resulting in the improvement of the quality of the product gas.

The present invention involves a coal gasification process in a reactor wherein the hot gases leaving the reactor are cooled in a plurality of cooling stages to a relatively low temperature, and a particulated solid is added to the hot gases and circulated therewith at least through one of the cooling stages. The heat transmission between gas and solids is greatly improved due to the addition of the solids as a result of their high heat capacity. In this manner, large quantities of gas can be quickly cooled in a small volume and thus critical temperature ranges can be quickly traversed so that soot formation or sticking which would otherwise occur in certain temperature ranges are avoided.

The particulate material added to the gases may be inert or reactive with respect to the gases. This enables a preferential elimination of specific contaminants by means of a suitable selection of the solid or additive admixed to the gases. The solids or additives serve the purpose of bonding the gaseous contaminants by means of adsorption, absorption and chemical reaction in order to prevent a sticking or agglomeration in the units following downstream. For example, a selective elimination of the fluorine or chlorine can take place in this manner. At the same time, however, inert substances can be added depending on the gas quality in order to achieve a controlled heat transmission.

In a preferred form of the present invention, a reactive solid such as calcium carbonate, $CaCO_3$, is added to the coal gas in a first stage and then an inert solid such as alumina, $Al_2O_3$, is added thereto in a second stage. It is thus possible to achieve an effective sulfur removal from the coal gas by means of the addition of calcium carbonate or, under some conditions, calcium oxide as well. At the same time, however, the $CO_2$ released from the calcium carbonate can react with the powdery carbon still present in the coal gas to form CO and thus improve the gas yield. The lime burned in this fashion can, for example, be added to the coal gasification reactor as a slag forming agent. As a result, the exhaust gas of the iron bath reactor can be used in a wide variety of applications, for example, it can be used as a synthesis gas or it can be utilized in a gas turbine for which particularly high levels of purity at low temperatures are required.

One of the features of the present invention resides in keeping the added substances at least partially in continuous circulation. The quantities of solid to be added can thereby be kept low and thus the costs can be reduced.

In a preferred form of the invention, the cooling in the first cooling stage brings the temperature of the gases down to about 1000° C. Cooling to this temperature range initially suffices in order to fall below the critical temperature range with only a slight outlay.

Another feature of the present invention resides in that the coal gas is simultaneously both directly as well as indirectly cooled. The indirect cooling permits the heat eliminated in this manner to be used economically in an advantageous fashion. For example, the highly volatile coal can be carbonized at low temperatures and the resulting carbonization gas can be employed in the gasification process. The carbonized and preheated coal can be added to the coal which is sent to the gasification reactor.

In one form of the present invention, the coal gas leaving the coal gasification reactor is mixed with limestone in a heat exchanger and the cooled coal gas together with the deacidified limestone resulting from the reaction with the gases are supplied to a multi-stage cyclone fluidized bed heat exchanger in which a solids/gas separation is carried out. The reactive solid passes through the heat exchanger and is passed into the gasification reactor to serve as a slag-forming agent in the coal gasification process after having been cooled. The coal gas which is partially rid of the solids is further cooled and conducted to a second heat exchanger-mixer zone in which it is mixed with an inert solid for further cooling. The coal gas charged with the inert solid is then supplied to a second multistage cyclone fluidized bed heat exchanger whereby the solid is cooled in the heat exchanger and is resupplied to the previous heat exchanger step. The cooled coal gas leaving the second cyclone fluidized bed heat exchanger is passed to a further heat exchanger in which a cooling to below 200° C. and preferably to about 100° C. occurs. Then, it is freed of the contaminants which still remain in gas-cleaning stages. The combination of these measures represents a particularly simple and economical method for the cleaning and heat recovery of coal gases.

The apparatus used in accordance with the present invention consists of at least one heat exchanger as well as at least one final cleaning stage. The heat exchanger is directly connected to the coal gasification reactor at the exhaust side thereof and is designed as a radiant cooler and solids/gas mixing device. This embodiment is very well suited as a particularly simple, structural means in order to quickly eliminate great quantities of heat.

In a preferred form of the invention, the heat exchanger is followed downstream by further heat exchangers, whereby a succeeding heat exchanger is designed as a cyclone fluidized bed heat exchanger and is also equipped to permit indirect heat exchange. The overall process can be optimized in terms of thermal balance in this fashion, in that each of the following heat exchangers permits a heat transmission to other agents. In the cyclone fluidized bed heat exchanger, for example, a cooling of the solids admixed in the first heat exchanger can be carried out, whereby oxygen for the coal gasification is simultaneously heated in indirect heat exchange.

In a preferred form of the invention, the cyclone fluidized bed heat exchanger is at least partially constructed so as to provide ceramic passages which are arranged in honeycomb style. This type of heat exchanger represents a particularly cost-favorable resolution of the problem whereby the heat exchanger is fireproof and is subjected to low wear.

Another feature of the present invention is that the final cleaning stage is designed as a dry deduster, utilizing a tubular filter element. The employment of a tubular filter guarantees extremely high purity of the product gas which has less than 5 mg of dust per cubic meter of gas, so that it is particularly suited for utilization in gas turbines.

BRIEF DESCRIPTION OF THE DRAWINGS

A further description of the present invention will be made in connection with the attached sheets of drawings which illustrate a preferred embodiment thereof.

DESCRIPTION OF THE PREFERRED EMBODIMENTS

Figure 1:
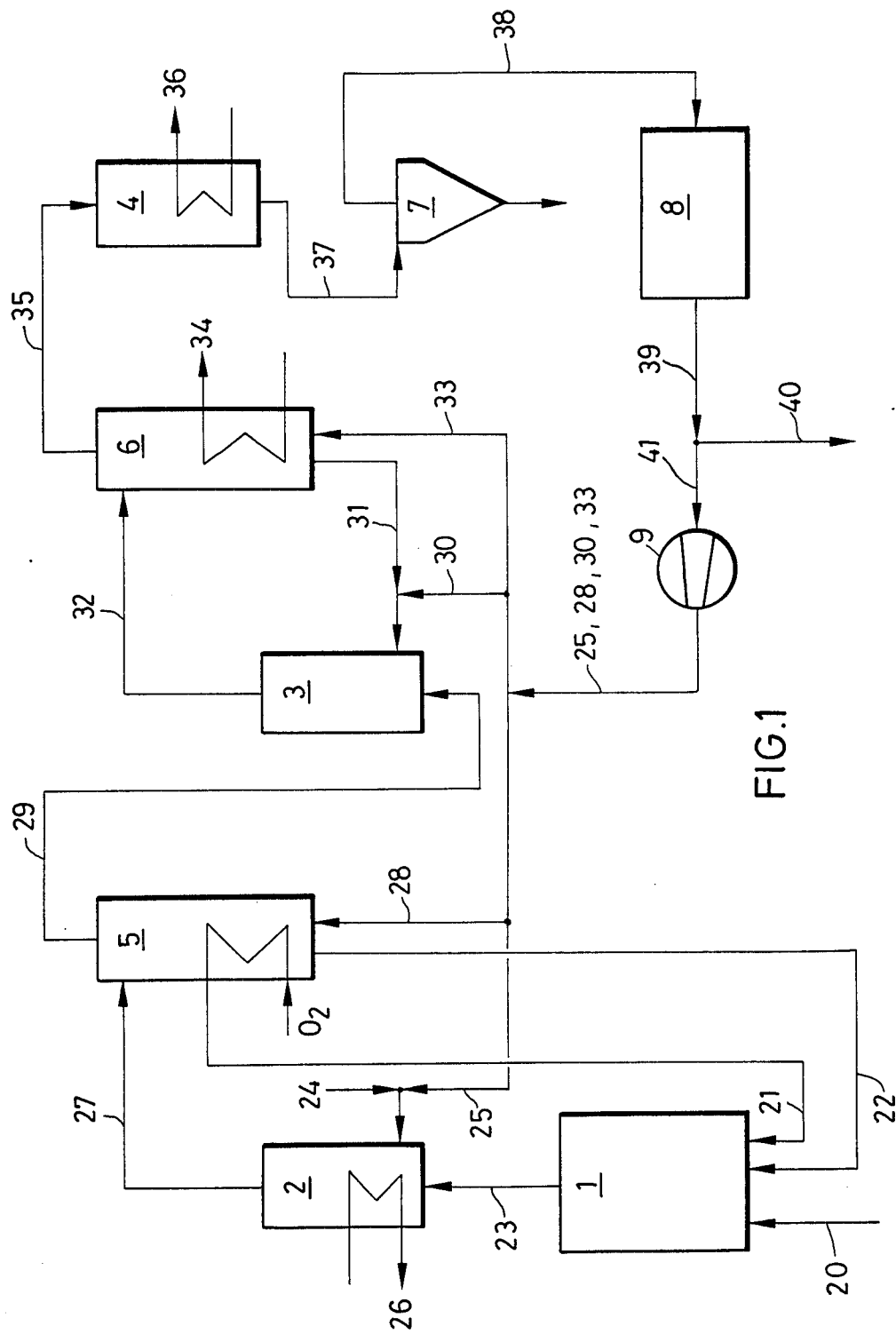
FIG. 1 is a process diagram for the gas cleaning and heat recovery system for a coal gasification process.

In FIG. 1, there is shown a process diagram for the improved method of the present invention in a coal gasification process. There is shown a coal gasification reactor 1, and subsequent heat exchanger-mixers 2, 3, and heat exchanger 4. A cyclone fluidized bed heat exchanger 5 is disposed between the heat exchanger-mixer 2 and the heat exchanger-mixer 3, while a cyclone fluidized bed heat exchanger 6 is disposed between the heat exchanger-mixer 3 and the heat exchanger 4. A cyclone separator 7 follows the heat exchanger 4 as well as a final cleaning stage 8 and a compressor 9.

Carbonaceous sources and protective gases are introduced through a line 20 into the coal gasification reactor 1 in combination with oxygen or air which enters through a line 21. Slag-forming additives such as CaO are introduced into the reactor through a line 22. The coal gas consisting of a crude mixture of carbon monoxide and hydrogen leaves the reactor through a discharge line 23 at a temperature of about 1350° C. contaminated with dust and other impurities. In the heat exchanger-mixer 2, the coal gas is mixed with a reactive solid entering through a line 24, the reactive solid for example being $CaCO_3$, as well as any additional additives necessary or desirable. The reactive solids are injected into the heat exchanger-mixer 2 by means of a sub-stream of relatively pure coal gas injected through a line 25. The highly endothermic reaction of $CaCO_3$ to CaO with the evolution of $CO_2$ occurs in the heat exchanger-mixer 2 whereby the $CO_2$ produced is converted into CO by reaction with carbon dust present in the gas. Heat is removed from the system through a line 26 in which a heat exchange fluid circulates. The cooled coal gas in the discharge line 27 contains the suspended solids and leaves the heat exchanger-mixer 2 at a temperature of about 1000° C. The solid suspension in the line 27 now enters the cyclone fluidized bed heat exchanger 5 in which the solid is first separated and the separated solid passes through the multi-stage fluidized bed heat exchanger 5 and into the line 22 where it is employed in the coal gasification reactor 1 as a slag-forming agent. In order to maintain the fluidized bed, the fluidized bed heat exchanger 5 is injected with cold, relatively pure coal gas through a line 28.

The oxygen entering the reactor through the line 21 is indirectly heated in the cyclone fluidized bed heat exchanger 5. Coal gas leaves the heat exchanger 5 through a line 29 and is conducted to a further heat exchanger-mixer 3 in which it is mixed with a further sub-stream of pure gas from a line 30 which, for example, injects an inert solid such as $Al_2O_3$ from a line 31.

Further cooled gas exits through a line 32 and is supplied to a second cyclone fluidized bed heat exchanger 6. The solids separated therein are cooled in the multi-stage fluidized bed heat exchanger 6 and proceed back to the heat exchanger-mixer 3 through the line 31. In order to maintain the fluidized bed, the fluidized bed heat exchanger is injected with cold pure coal gas from a line 33. Heat is withdrawn from the cyclone fluidized bed heat exchanger 6 by circulating a heat exchange fluid through the line 34. Coal gas from which the inert solid has been removed is discharged through a line 35 and is conducted to a heat exchanger 4 downstream in order to cool it to a specific final cleaning temperature which preferably lies at about 100° C. In the heat exchanger 4, heat is withdrawn from the system by circulating a heat exchange fluid through a line 36. A gas which still has some dust contained in it is withdrawn by means of a line 37 and is pre-cleaned, for example, in a cyclone separator 7. A pre-cleaned gas is discharged through a line 38 into a final cleaning stage 8 consisting of a dry dedusting stage including a tubular filter, and a cleaned product gas is discharged through lines 39 and 40. The gas is sufficiently pure to be used as such in a gas turbine. A sub-stream of gas is directed by means of a line 41 into the compressor 9 to be used as a carrier gas in the lines 25, 28, 30 and 33. The heat abstracted from the heat exchangers 2, 4 and 6 may be used to reheat the product gas or to operate a steam turbine for driving a compressor for generating the oxygen, thereby making the operation of the iron bath reactor 1 largely self-sufficient once the operation has started.

Figure 2:
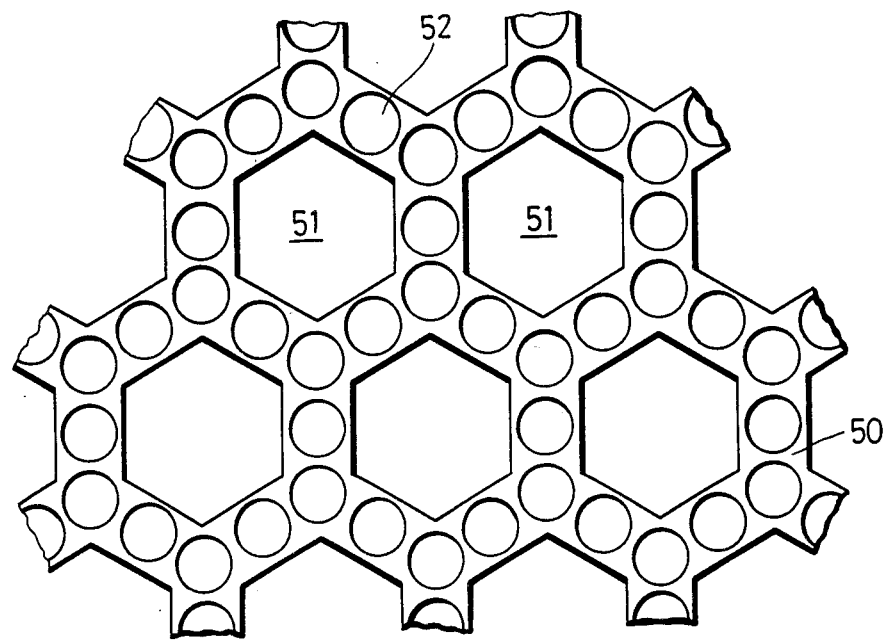
FIG. 2 illustrates somewhat schematically the internal structure of a fluidized bed heat exchanger consisting of a novel arrangement of passages.
Figure 3:
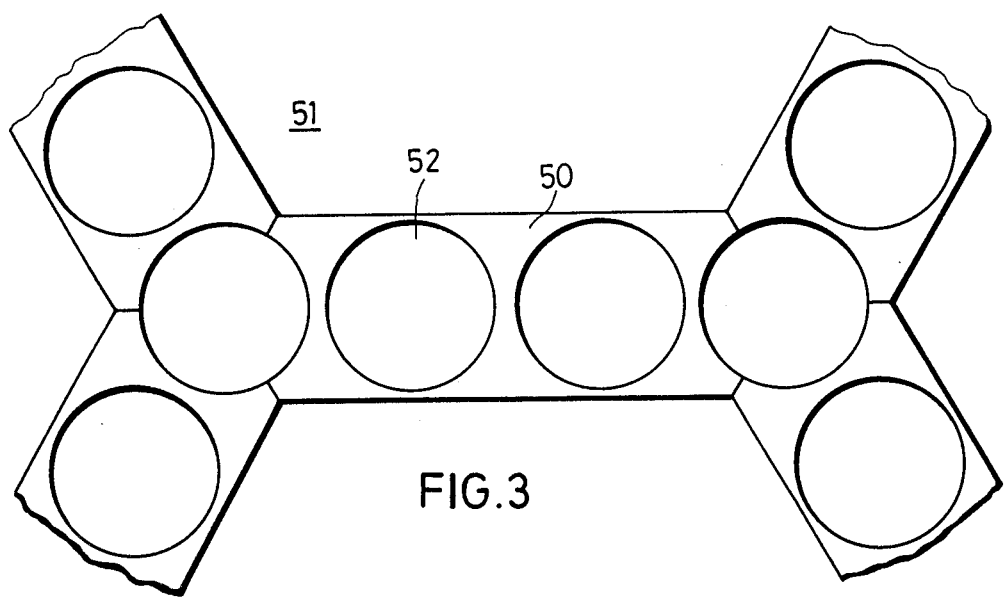
FIG. 3 is a further illustration of the parts shown in FIG. 2.

FIGS. 2 and 3 show a suitable construction for the indirect fluidized bed heat exchanger such as heat exchanger 5 shown in FIG. 1. This interior structure includes ribs 50 forming a generally honeycomb core 51 in which the fluidized bed rises. The heat content is partially emitted to the gases such as oxygen flowing through circular passages 52. The circular passages 52 can also be lined with metallic conduits which could not otherwise be exposed to the abrasive fluidized bed.

The following tables illustrate a mass balance and a thermal balance employing typical values for operating the method of the present invention.

| I. MASS BALANCE | | | | |
|---|---|---|---|---|
| Reference Numeral | Substance | Flow in kg/s | Temperature, °C. | Pressure, bar |
| 20 | Coal | 2.778 | | |
| | N$_2$ | | | |
| | propane | | | |
| 21 | O$_2$ | 2.370 | 214 | |
| 22 | CaO | 0.433 | 300 | |
| 23 | Coal gas | 5.479 | 1350 | 10 |
| | (CO = 67.5% | | | |
| | H$_2$ = 29.5% | | | |
| | N$_2$ = 2.8%) | | | |
| 24 | CaCO$_3$ | 0.732 | 20 | |
| 25 | Pure gas | 0.1 | 150 | |
| 27 | Coal gas | 5.919 | 1000 | |
| | CaO | 0.433 | | |
| 28 | Pure gas | 0.037 | 150 | |
| 29 | Coal gas | 5.959 | 950 | |
| 30 | Pure gas | 1.672 | 150 | |
| 31 | Al$_2$O$_3$ | 9.834 | 155 | |
| 32 | Coal gas | 7.672 | 500 | |
| | Al$_2$O$_3$ | 9.834 | | |
| 33 | Pure gas | 0.861 | 150 | |
| 35 | Coal gas | 8.489 | 450 | |
| 37 | Coal gas | 8.489 | 100 | |
| 40 | Product gas | 5.819 | | |
| 41 | Pure gas | 2.67 | | |

| -continued | | |
|---|---|---|
| II. THERMAL BALANCE | | |
| Reference Numeral | Type | Amount MW |
| 26 | Heat emission | 1.4 |
| 34 | Heat emission | 3.94 |
| 36 | Heat emission | 4.35 |

It should be evident that various modifications can be made to the described embodiments without departing from the scope of the present invention.

We claim as our invention:

1. In a method for cleaning hot gases produced during a coal gasification process in a reactor wherein the hot gases leaving said reactor are cooled in a plurality of cooling stages to a relatively low temperature, the improvement which comprises:
   adding CaCO$_3$ to the hot gases in a first stage, adding Al$_2$O$_3$ to said gases in a later stage and circulating the added solids in suspension in said gases in separate stages of said plurality of stages.

2. A method according to claim 1 wherein said CaCO$_3$ decomposes in said hot gas to liberate carbon dioxide and said Al$_2$O$_3$ remains inert while circulating in said hot gas, said hot gas being cooled to about 1000° C. in the first cooling stage, said gas being cooled directly by chemical reaction with said CaCO$_3$ and indirectly by contact with said Al$_2$O$_3$.

3. A method according to claim 1 which includes the step of:
   continuously circulating said particulated solid through said one stage.

4. A method for the production and cooling of coal gas which comprises:
   generating a hot, contaminated coal gas in a gasification reactor,
   mixing said hot coal gas with limestone in a first heat exchange-mixer zone to deacidify said limestone,
   separating solids from the cooled gas from said first heat exchange-mixer zone in a first cyclone fluidized bed heat exchanger,
   passing the deacidified solids from said first cyclone fluidized bed heat exchanger into said gasification reactor as a slag-forming agent,
   mixing the cooled coal gas from said first cyclone fluidized bed heat exchanger with an inert solid in a second heat exchange-mixer zone,
   passing the coal gas-inert solid mixture into a second cyclone fluidized bed heat exchanger,
   passing the cooled solid from said second cyclone fluidized bed heat exchanger into said second heat exchange-mixer zone, and
   further cooling the coal gas leaving said second cyclone fluidized bed heat exchanger.

5. A method according to claim 4 wherein said further cooling is carried out to reduce the temperature of said gas to below 200° C.

6. A method according to claim 4 wherein said further cooling is carried out to reduce the temperature of said gas to about 100° C.

7. In an apparatus for the gasification of coal including a gasification reactor, at least one heat exchanger zone following said gasification reactor, and at least one cleaning stage following said heat exchanger zone, the improvement which comprises:
   a heat exchanger-mixer connected to the exhaust side of said gasification reactor, said heat exchanger-mixer being both a radiant cooler and a solids/gas mixing stage, conduit means arranged to deliver high temperature gases directly from said reactor to said heat exchanger-mixer, and means for introducing solid particles into said heat exchanger-mixer for admixture with said high temperature gases.

8. An apparatus according to claim 7 wherein said heat exchanger-mixer is followed by a plurality of additional heat exchangers at least one of which is a cyclone fluidized fed heat exchanger provided with (1) means for indirect heat exchange, (2) means for introducing cooled gas from said heat exchanger-mixer therein, and (3) means for discharging solid particles therefrom.

9. An apparatus according to claim 8 wherein said fluidized bed heat exchanger includes ceramic portions disposed in honeycomb fashion.

10. An apparatus according to claim 7 wherein said cleaning stage consists of a dry dedusting stage including a tubular filter.

* * * * *